(No Model.) 4 Sheets—Sheet 1.

M. W. CLARK.
DUST COLLECTOR.

No. 540,720. Patented June 11, 1895.

Witnesses:
Geo. W. Young.
Chas. L. Goss.

Inventor:
Myron W. Clark,
By Winkler Flanders Smith Bottum & Vilas
Attorneys.

(No Model.) 4 Sheets—Sheet 2.
M. W. CLARK.
DUST COLLECTOR.
No. 540,720. Patented June 11, 1895.
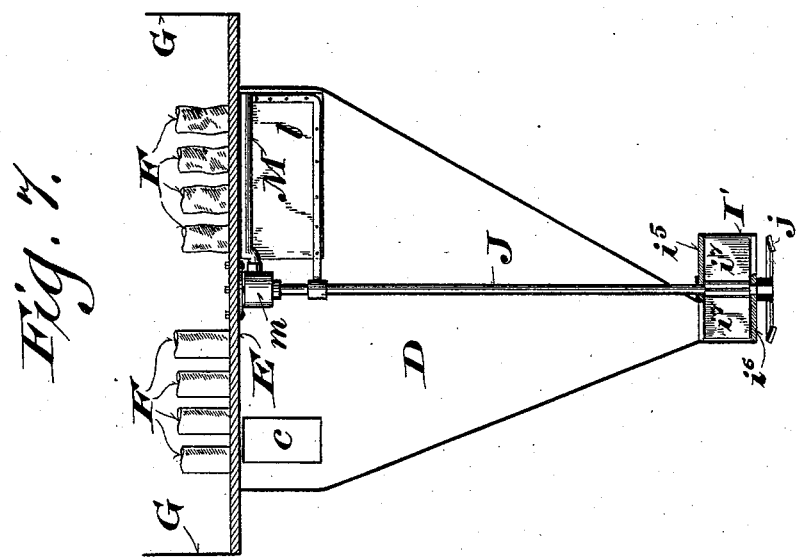
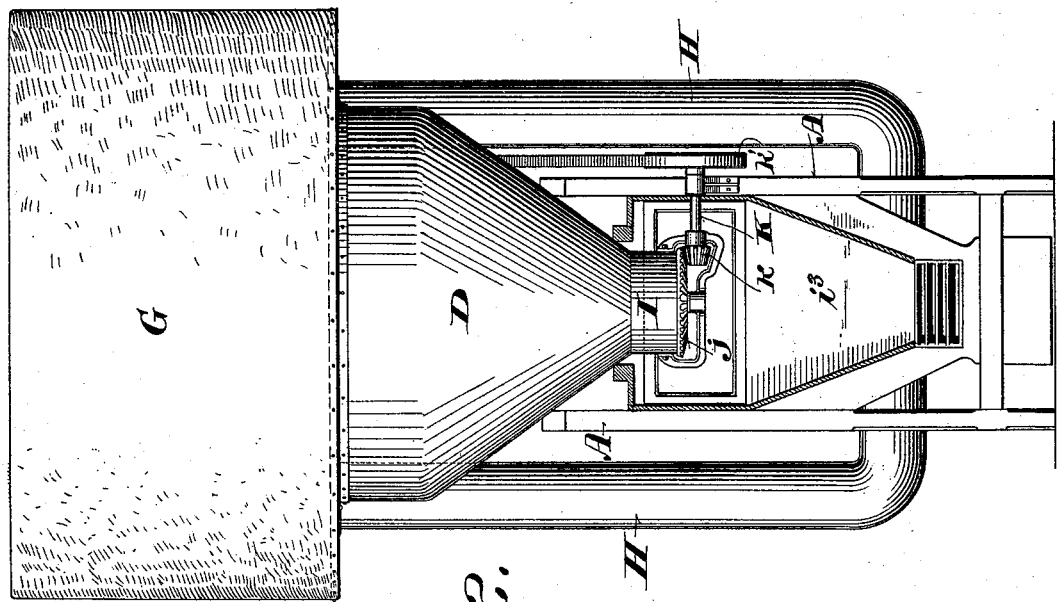
Witnesses:
Geo. W. Young,
Chas. L. Goss.
Inventor:
Myron W. Clark,
By Winkler, Flanders, Smith, Bottum & Vilas,
Attorneys.
THE NORRIS PETERS CO., PHOTO-LITHO., WASHINGTON, D. C.

(No Model.) 4 Sheets—Sheet 3.
M. W. CLARK.
DUST COLLECTOR.
No. 540,720. Patented June 11, 1895.
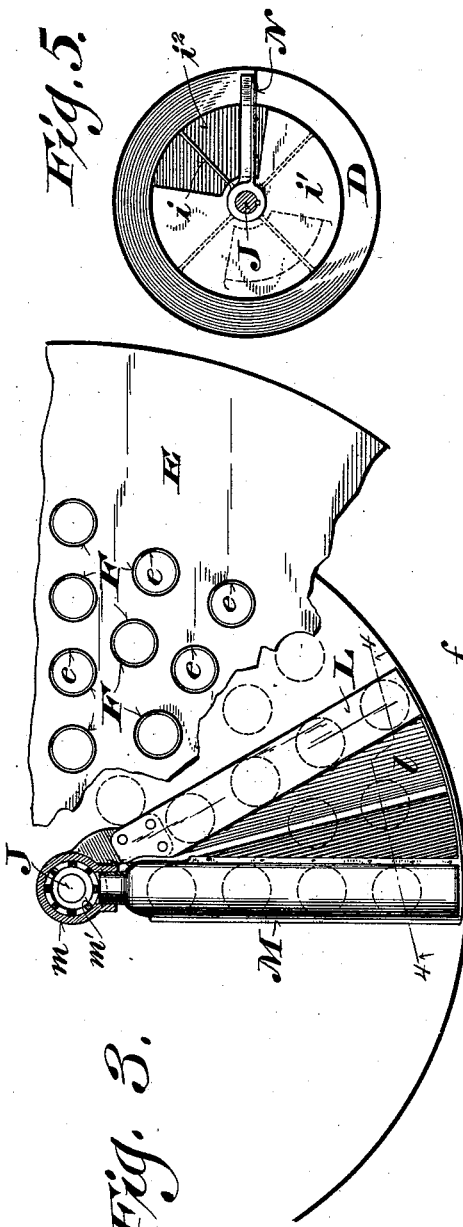
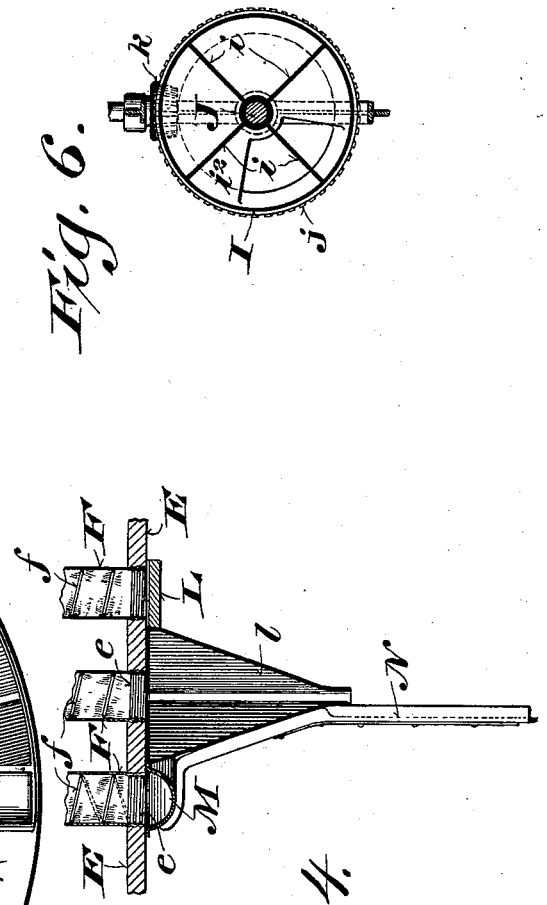
Witnesses:
Geo. W. Toury.
Chas. L. Goss.
Inventor:
Myron W. Clark,
By Winkler, Flanders, Smith, Bottum & Vilas.
Attorneys.

(No Model.) 4 Sheets—Sheet 4.

M. W. CLARK.
DUST COLLECTOR.

No. 540,720. Patented June 11, 1895.

Witnesses:
Geo. W. Young.
Chas. L. Goss.

Inventor:
Myron W. Clark,
By Winkler Flanders Smith Bottum & Vilas
Attorneys.

UNITED STATES PATENT OFFICE.

MYRON W. CLARK, OF PARMA, MICHIGAN.

DUST-COLLECTOR.

SPECIFICATION forming part of Letters Patent No. 540,720, dated June 11, 1895.

Application filed September 14, 1894. Serial No. 522,999. (No model.)

*To all whom it may concern:*

Be it known that I, MYRON W. CLARK, of Parma, in the county of Jackson and State of Michigan, have invented certain new and useful Improvements in Dust-Collectors; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to produce a simple, effective dust collector of large capacity in a small compass.

It consists of certain peculiarities in the construction and arrangement of the component parts of the machine hereinafter particularly described and pointed out in the claims.

In the accompanying drawings like letters designate the same parts in the several figures.

Figure 1:
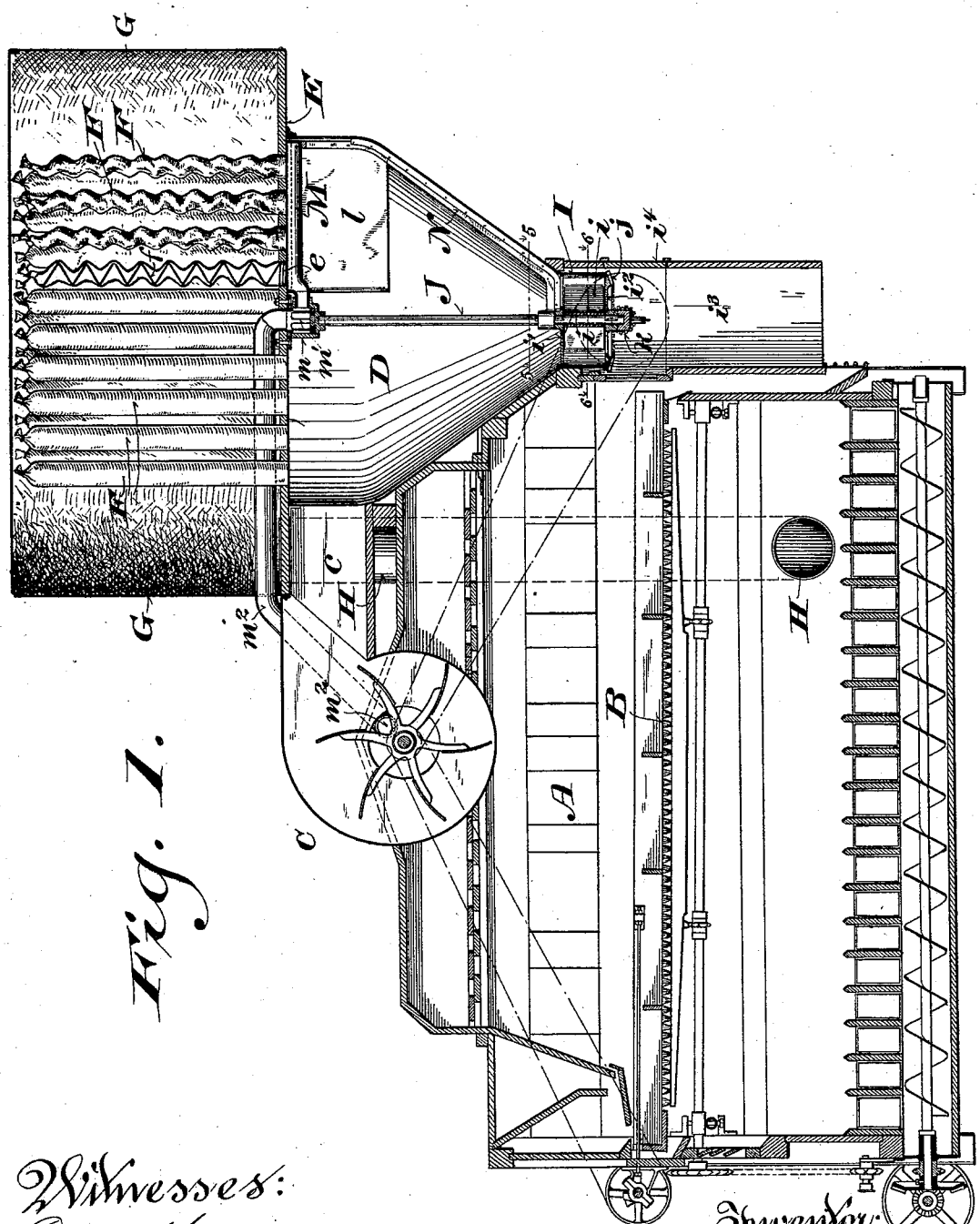
Figure 9:
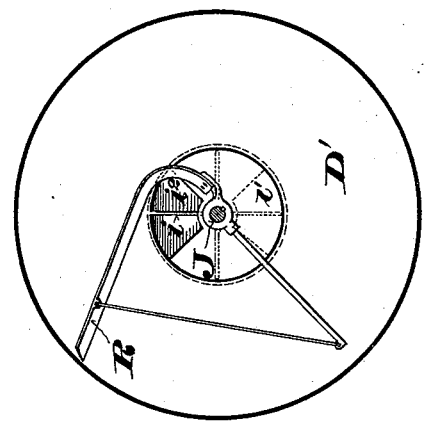
Figure 8:
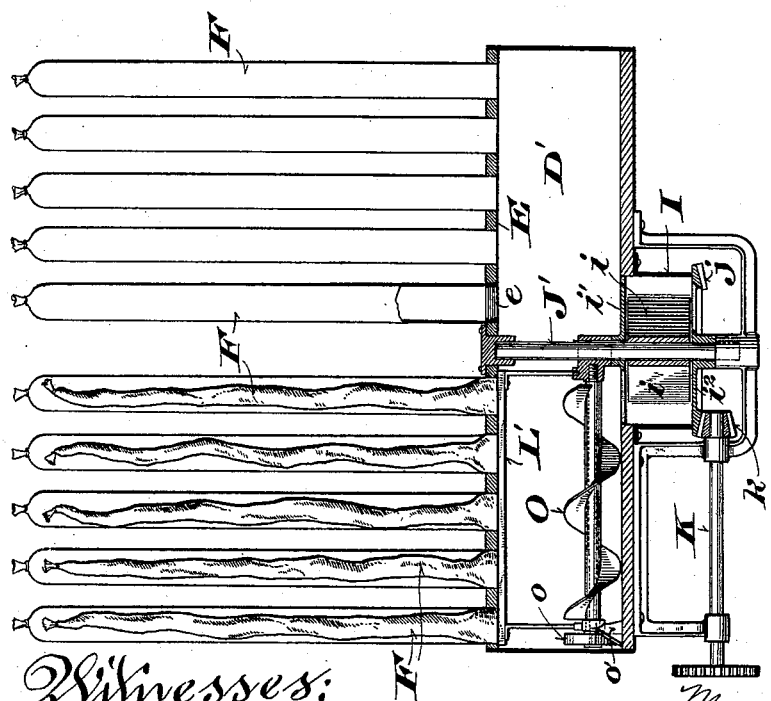

Figure 1 is a vertical medial section of my improved dust-collector in connection with a purifier. Fig. 2 is an end elevation of the same as viewed from the right with reference to Fig. 1. Figs. 3 and 4 are detail views, on an enlarged scale, of the cut-off and reverse-current connection, Fig. 3 being a horizontal section, and Fig. 4 a vertical section on the line 4 4, Fig. 3. Figs. 5 and 6 are enlarged horizontal sections on the lines 5 5 and 6 6, respectively, Fig. 1, showing the automatic discharge device of the dust-chamber. Fig. 7 is a vertical section showing a modified form of the discharge device. Fig. 8 is a similar view showing a modification of the dust-chamber; and Fig. 9 is a horizontal section of a dust-chamber like or similar to that of Fig. 8, but showing a different device for moving the dust to the central discharge.

Referring to Figs. 1 and 2, A designates a purifier to which my improved dust collector is applied, provided in the usual manner with a shaking sieve B, and a fan C, arranged to produce an upward current of air through the sieve.

D is a funnel shaped dust chamber constituting a part of the dust collector and connected on one side at or near the top with the fan C through the outlet or blast pipe $c$ of said fan, the intake openings of the fan communicating with the purifier chamber above the sieve.

Upon the top of the dust chamber D is mounted a perforated board or plate E, in the openings of which are fastened numerous cloth tubes F F, closed at their upper ends. In a circular form of the machine like that shown in Fig. 1, these tubes are preferably arranged in radial rows, as shown in Fig. 3. When employed in an air belt machine these tubes are inclosed by a casing G, which may be conveniently made of cloth as shown, but may be made of wood, sheet metal or any other suitable material. This casing or the space inclosed thereby around the cloth tubes, is connected when the dust collector is applied to a purifier, by one or more pipes H H, with the purifier chamber below the sieve, but may be connected directly with the intake openings of the fan when the machine is not used in connection with the purifier.

The funnel shaped dust chamber D may be conveniently and economically made of sheet metal. It is provided at its lower end with an air excluding, dust discharging device I, shown in detail in Figs. 5 and 6, and consisting of a cylindrical neck or extension of the lower end of the dust chamber divided into a number of compartments by stationary radiating partitions $i\ i$, and provided at the top and bottom close to said partitions, with rotary disks $i'$ and $i^2$, mounted on a vertical shaft J, and having openings corresponding in size with the compartments formed by said partitions and arranged on opposite sides of said shaft, so that they will not both communicate at the same time with the same compartment. The lower disk $i^2$ is formed with or attached to a bevel gear $j$, which is engaged by a pinion $k$ on a horizontal shaft K, provided with a pulley $k'$, as shown in Fig. 2, and driven by a belt as indicated in Fig. 1, from a pulley on the fan shaft, or it may be driven by means of any other convenient connection.

$i^3$ is a spout extending below the discharging device and preferably constructed with a removable section $i^4$, to permit of the withdrawal of the purifier sieve B in the usual manner.

To the upper end of the shaft J is attached a cut off plate or board L, shown in Figs. 3 and 4, which is constructed and arranged to close the lower ends of the tubes F F opening into the dust chamber D, one row after another, as it is moved by the shaft J around the under side of the perforated board or plate E. To the rear edge of this cut off board or plate is attached a discharge spout $l$, which has a contracted opening at its lower end, preferably below the opening of the blast pipe $c$ of the fan into the dust chamber.

M is a trough attached at one end to the upper end of shaft J and carried thereby just behind the discharge spout $l$ in a radial position close to the under side of the perforated board E and constituting a reverse current passage. It is connected at its inner end with a cylindrical box $m$, attached to the upper end of said shaft and turning on a hollow trunnion $m'$, having openings in its sides and attached to the under side of the plate or board E. A pipe $m^2$, connects this hollow trunnion with the intake of the fan.

N is a scraper carried by the shaft J and shaped to fit the inside of dust chamber D so as to move the dust collecting therein toward the discharge device I at its lower end and prevent it from settling and remaining upon the walls of said chamber. When a reverse current is employed, the tubes are provided on the inside with open wire spirals or frames $f$, as shown in Figs. 1 and 4, to prevent their complete collapse. The tubes may be conveniently secured in the board E by spirally bent wires $e\ e$, which are screwed inside of said tubes into corresponding threads formed in the openings of said board, or by expansible rings pressed outwardly against the cloth in said openings. A simple and reliable fastening is thus afforded, whereby the tubes may be easily and quickly removed when worn or defective, and replaced.

The machine above described operates as follows: The dust laden air is driven by the fan C into the dust chamber D, and thence upwardly into and through the cloth tubes F F, the texture of which is such that the air may pass through them, but the dust will be caught and retained on their inner sides. By the construction and arrangement of tubes hereinbefore described, ample area of cloth is provided within a small compass. It is obvious that if the air current through the tubes were uninterrupted, the cloth would in a short time become choked with dust and render the device inoperative, but the cut off board or plate L, closing the lower ends of each row of tubes at stated intervals by shutting off the draft therefrom, permits the dust adhering to their inner sides to fall upon the cut off board or plate, and as it advances to drop through the discharge spout $l$ into the lower part of the dust chamber. The spout $l$ intercepts the air current at the rear edge of the cut off board and prevents the dust from being carried back into the tubes as the cut off board advances and opens their lower ends.

In case any dust is left adhering to the insides of the tubes after the passage of the cut off board, it will be detached and withdrawn therefrom by the reverse current through the trough M and the pipe $m^2$, into the fan, by which it is again driven into the dust chamber.

The dust falling from the discharge spout upon the inner walls of the dust chamber, will be scraped therefrom and moved down to the discharging device I by the scraper N, and dropping through the opening in the upper disk $i'$ in rotation into the several compartments between the partitions $i$, will be discharged therefrom in rotation as the opening in the lower disk $i^2$ passes under said compartments. The dust is thus constantly removed from the dust chamber without admitting air thereto except through the fan, as above explained, and is thence conducted through the spout $i^3$ to a convenient point of discharge.

The details of the machine may be variously modified within the intended scope of my invention.

Referring to Fig. 7, the air inlet connection $c$ is shown as made tangential to the dust chamber, so as to produce a centrifugal action of the dust laden air, whereby a portion of the dust will be separated therefrom before it passes upwardly into the cloth tubes, thus relieving the cloth. The discharging device I' at the lower end of the dust chamber is provided with a stationary cover $i^5$ and a stationary bottom $i^6$, having openings on opposite sides out of line with each other, and in place of stationary radiating partitions it is provided with rotary wings $i^7\ i^7$, mounted on the shaft J. The funnel shaped dust chamber is contracted at its lower end to the size of and connects with the opening in the top $i^5$, and the rotary wings $i^7$ are so arranged as to constantly cut off communication between the openings in the top and bottom of the dust discharging chamber. The operation of the device is similar to that shown in Fig. 1, except that the compartments of the dust discharging chamber, instead of the openings in the top and bottom thereof, are moved.

In Fig. 8 I have shown a cylindrical dust chamber D' in place of the funnel shaped chamber of Fig. 1, and to conduct the dust from the outer portions thereof to the dust discharging device I at the center, I provide a screw conveyer O, which is carried in a radial position from the central shaft J', and is driven at its outer end by a roller $o$, which runs upon the bottom of the dust chamber. A scraper $o'$ removes the dust from the path of said roller. In this case the cut off board L' is supported and carried by the conveyer.

Referring to Fig. 9, a scraper R is shown in place of the conveyer O for moving the dust on the bottom of the dust chamber toward the center, in a machine like or similar to that shown in Fig. 8.

The dust laden air may be blown or drawn into the upper ends of the cloth tubes by providing an inlet chamber and cut off at their upper ends, which are in this case supported and open into said chamber, their lower ends opening, as shown, into a substantially air tight dust chamber. Under these conditions the reverse draft connection when used would be made with the upper ends of the tubes and the discharge spout $l$ being unnecessary could be dispensed with. The cut off may be made to dwell if desired opposite each row of tubes for a certain time.

It will be seen that when the tubes are inflated they will stand up alone, the spirals within them being enough smaller to leave their entire inner surfaces free. Hence the filtering surface is not obstructed nor reduced. When the internal pressure ceases and a back draft is produced, the inner surfaces of the tubes so affected, are thrown suddenly and forcibly against the internal spirals, thereby detaching and throwing down adhering particles; while the walls or inner surfaces of the tubes are held apart and precluded from making contact, which would cause the particles to be held between the walls and thus prevent them from escaping or falling from the tubes.

By so constructing the machine that the filtering apparatus stands still, and causing the suction spout or back-draft device to travel, I am enabled to operate the machine with a minimum amount of power, thus avoiding wear, reducing the difficulty of packing, and producing tight joints, and obviating the production of interfering air currents, such as will result if a large drum be rotated at any considerable speed. The spirals serve not only to prevent complete collapse of the filtering tubes, but also to secure said tubes in their openings, for which purpose it is important that the coil be such as to fit the threads of the openings, and sufficiently elastic to press and hold the cloth firmly to its seat, without cutting or tearing it. Being merely screwed into the openings, the spirals can be readily removed, and the tubes can thereby be made free for removal and replacement, which is a quite important feature of construction, since the cloths need to be renewed somewhat frequently.

By making the walls of the tube-containing chamber of porous or pervious material, and having a blast of air from the interior of the tubes outward into said chamber, I prevent the influx of air from without the machine, except as it may enter through the walls of said chamber. In other words, if through leakage of air from the purifier, (when the collector is used therewith) or if by reason of impedance of the air in the dust collector, the tube chamber should not contain sufficient air to supply the purifier screen and fan, a due quantity would be drawn through casing G to supply the deficiency, and being filtered by such cloth, the air drawn in would be free from soot or other impurities of the atmosphere, and the product would be uninjured. Lastly, by effecting a preliminary separation in chamber D through centrifugal action, which is accomplished by arranging the dusty-air inlet in a tangential relation to said chamber, I am enabled to take out a large percentage of the impurities, and particularly the heavier particles, thus greatly relieving the tube.

I claim—

1. In a dust-collector, the combination of a dust chamber; an inlet connection through which dust-laden air is driven; a dust discharging device; a number of stationary cloth tubes opening into said chamber and communicating with said inlet connection so as to compel the air blast or current to pass through the walls of said tubes; a traveling cut-off device constructed and arranged to register at intervals with the open intake ends of said tubes, to cut them off from the direct current; and a fan communicating with said cut-off and serving to produce a reverse current through the tubes, substantially as and for the purposes set forth.

2. In a dust-collector, the combination of a dust chamber provided with an air-excluding dust-discharging device; a number of cloth tubes opening at their ends into said dust-chamber; a pervious casing inclosing said tubes; and a fan connected with the interior of said tubes and with the space inclosed by said casing around them, so as to form therewith an endless air belt or circuit and compel the air to pass through the walls of said tubes, substantially as and for the purposes set forth.

3. In combination with a purifier, a dust-collector comprising a dust-receiving chamber, a series of filtering tubes communicating at one end with said chamber, a filtering-walled inclosing chamber for said tubes, an air-conduit connecting the dust-receiving chamber with the purifier fan, and a second air-conduit connecting the tube-inclosing chamber with the interior of the purifier, substantially as set forth; whereby the fan is caused to pass the dust-laden air from the purifier to the filtering tubes, and to return the air after filtration, to the purifier to again take up dust, using the same body of air continuously.

4. In combination with a stationary platform or board having a series of openings, filtering tubes or cloths applied to said openings, a fan adapted to force dust-laden air through the openings, a hollow cut-off adapted to travel over the openings and to cover the same successively, and means for producing a continuous suction or back draft through said cut-off, substantially as explained, whereby air is caused to travel first in one and then in the other direction through the filtering cloths, without necessitating travel of the latter.

5. In combination with an air-receiving chamber having a stationary wall E provided with openings e, a series of filtering tubes having their mouths applied to said openings, a fan serving to deliver dust-laden air to the air-chamber, a traveling hollow cut-off adapted to cover the openings successively and to cut off communication with the air chamber, a suction pipe communicating with the interior of said cut-off, and a fan serving to produce a return current or back-draft through the cut-off and the tubes whose mouths are covered by the cut-off.

6. In a dust collector, the combination of a chamber having openings in one wall, and cloth tubes secured at their open ends in said openings by means of elastic or self-expanding rings, substantially as and for the purpose set forth.

7. In a dust collector, a filtering tube or bag of porous material, provided with an internal frame supported at its lower end only, and serving to prevent complete collapse of the tube or bag when free from internal air pressure.

8. In combination with an air chamber, a filtering tube or bag located above said chamber and having its lower end in communication therewith, and an open frame or support slightly smaller than and extending upward within the tube or bag, whereby it is adapted to prevent complete collapse of the bag when the latter is free from internal air pressure.

9. In combination with an air chamber, a filtering tube or bag located above and communicating at its lower end with said chamber, and an elastic support extending upward within the tube or bag to prevent complete collapse thereof, said support being free to yield and move laterally to permit shaking or agitation of the filtering body.

10. In combination with a board or platform, provided with an opening, a filtering tube or bag having its mouth inserted within said opening, and an elastic ring inserted within said mouth and serving to bind the same against the walls of the opening.

11. In combination with a board or platform having a hole provided with a spirally grooved or threaded wall, a filtering bag having its mouth inserted into said hole, and a spiral coil of wire placed within the mouth of the bag and screwed into said hole, substantially as set forth; whereby it is adapted to secure the bag in place, but may be readily removed.

12. In combination with a board or platform provided with a hole or opening the walls of which are spirally grooved or threaded, a filtering tube or bag having its mouth inserted into said hole or opening, and a wire coil extending upward within the tube or bag and having its lower end coiled to fit the threads or grooves of the opening in the board or platform and secured therein, whereby the spiral is firmly secured in place, and is caused to retain the mouth of the tube or bag in the opening and to sustain the tube when the latter is free from internal air pressure.

13. In a dust-collector, the combination of a dust chamber provided with an air inlet connection, cloth tubes opening at their ends into said chamber, a reverse-current connection arranged to register at intervals with the open intake ends of said tubes, and open frames inserted inside of said tubes so as to prevent their complete collapse when a reverse current is produced through them, substantially as and for the purpose set forth.

14. In a dust-collector, the combination of a dust-chamber; cloth tubes opening at their lower ends into said chamber; and an air-excluding dust-discharging device consisting of a chamber divided into compartments by fixed wings or partitions, and rotatable top and bottom plates each provided with an opening, said openings having different angular relation to the axis of rotation, whereby they are prevented from communicating simultaneously with the same compartment, but are caused to communicate therewith in alternation or succession.

15. In a dust collector, the combination of a dust-chamber; cloth tubes opening at their lower ends into said chamber; a dust-discharging device consisting of a chamber divided into compartments, and of rotatable top and bottom plates having openings arranged to come alternately or successively in register with the compartments; and a conveyer arranged to move the dust deposited on the walls of the dust chamber to said dust-discharging device, substantially as and for the purpose set forth.

16. In a dust-collector, the combination of a dust chamber; cloth tubes opening at their lower ends into said chamber; a dust-discharging device at the bottom of said chamber consisting of a chamber divided into compartments, and of top and bottom plates mounted upon a rotary vertical shaft close to the upper and lower ends of said compartments, and having openings arranged to register one at a time in rotation with said compartments, substantially as set forth.

17. In a dust-collector, the combination of a dust chamber, a vertical rotary shaft, cloth tubes opening at their lower ends into said chamber, a direct air current inlet connection with the open ends of said tubes, a trough or air passage carried by said shaft close to the open intake ends of said tubes, and a continuous reverse draft connection with the trough, substantially as and for the purposes set forth.

18. In a dust-collector, the combination of a circular, funnel shaped dust-chamber provided with a direct air inlet, and having a dust-discharging device at the bottom consisting of a chamber divided into compartments by stationary wings or partitions, and of top and bottom plates having openings arranged to alternately register with said compartments, cloth tubes opening at their lower ends into said dust-chamber, and a traveling cut-off provided with a reverse draft connection and carried close to the open intake ends of the tubes by a rotary shaft, substantially as and for the purpose set forth.

19. In a dust collector, the combination of a dust chamber having an air inlet opening in one side, cloth tubes closed at their upper ends and opening at their lower ends into said chamber, a fan, the outlet of which communicates with said dust chamber through the opening in the side thereof, a trough or open passage carried close to the lower ends of said tubes by a central rotary shaft in said dust chamber, and a reverse draft passage connecting said trough with the intake of said fan, substantially as and for the purposes set forth.

20. In a dust collector, the combination of a dust chamber having an air inlet opening in one side, cloth tubes closed at their upper ends and opening at their lower ends into said chamber, a fan, the outlet of which communicates with said dust chamber through the inlet opening in its side, and a pervious casing inclosing a space around said tubes which communicates with the intake of the fan, substantially as and for the purposes set forth.

21. In a dust collector, the combination of a dust chamber having an inlet opening in one side, a fan, the outlet of which is connected with said chamber through said inlet opening, cloth tubes closed at their upper ends and opening at their lower ends into said chamber, a cut-off plate or board and a trough or open passage carried close to the lower ends of said tubes by a central vertical shaft in said dust chamber, and a reverse draft passage connecting said trough with the intake of the fan, substantially as and for the purposes set forth.

22. In a dust collector, the combination of a dust chamber, a fan, the outlet of which is connected with said chamber, cloth tubes closed at their upper ends and opening at their lower ends into said chamber, a cut-off board or plate and a trough carried close to the lower ends of said tubes by a central vertical shaft in said dust chamber, a depending discharge spout attached to the rear edge of said cut off board or plate between it and said trough, and a reverse draft passage connecting said trough with the intake of the fan, substantially as and for the purposes set forth.

23. In a dust collector, the combination of a dust-chamber having an air inlet at one side, a series of filtering tubes communicating with the top of said chamber, and a traveling cut-off provided with a delivery spout which extends downward within the dust chamber to the level of the lower side of the air inlet and there opens into the dust chamber; whereby the dust delivered through said spout is carried below the incoming air current, but is discharged into the dust chamber.

In testimony that I claim the foregoing as my own I affix my signature in presence of two witnesses.

MYRON W. CLARK.

Witnesses:
  CHAS. L. GOSS,
  M. L. EMERY.